(12) United States Patent
Georgilas

(10) Patent No.: US 11,321,995 B1
(45) Date of Patent: May 3, 2022

(54) VIDEO GAMING SYSTEM AND METHOD OF UTILIZING THE SAME

(71) Applicant: Justin Georgilas, Las Vegas, NV (US)

(72) Inventor: Justin Georgilas, Las Vegas, NV (US)

( * ) Notice: Subject to any disclaimer, the term of this patent is extended or adjusted under 35 U.S.C. 154(b) by 0 days.

(21) Appl. No.: 17/450,685

(22) Filed: Oct. 12, 2021

(51) Int. Cl.
*G07F 17/00* (2006.01)
*G07F 19/00* (2006.01)
*G07F 17/32* (2006.01)
*G06F 3/0481* (2022.01)

(52) U.S. Cl.
CPC ........ *G07F 17/3262* (2013.01); *G06F 3/0481* (2013.01); *G07F 17/3209* (2013.01); *G07F 17/3213* (2013.01); *G07F 17/3244* (2013.01)

(58) Field of Classification Search
CPC ............ G07F 17/3209; G07F 17/3213; G07F 17/3244; G07F 17/326; G07F 17/3262; G07F 17/3267; G07F 17/3269; G07F 17/34
See application file for complete search history.

(56) References Cited

U.S. PATENT DOCUMENTS

| | | | |
|---|---|---|---|
| 6,572,473 B1* | 6/2003 | Baerlocher | G07F 17/34 273/143 R |
| 7,179,166 B1* | 2/2007 | Abbott | G07F 17/32 273/429 |
| 8,100,761 B2* | 1/2012 | Bennett | G07F 17/3267 463/25 |
| 2003/0199306 A1* | 10/2003 | Parker | G07F 17/3244 463/20 |
| 2004/0147306 A1* | 7/2004 | Randall | G07F 17/3262 463/20 |
| 2006/0030400 A1* | 2/2006 | Mathis | G07F 17/32 463/20 |
| 2008/0004098 A1* | 1/2008 | Bennett | G07F 17/3211 463/16 |
| 2009/0042636 A1* | 2/2009 | Taylor | G07F 17/3244 463/20 |

* cited by examiner

*Primary Examiner* — Milap Shah
(74) *Attorney, Agent, or Firm* — FisherBroyles, LLP; Rob L. Phillips

(57) ABSTRACT

A video gaming system and method for conducting a casino game of chance wherein a skill input by a player determines whether the game outcome will be a win or a loss. Once the skill input is evaluated, a game play (e.g., spinning slot reels) is activated whereby the outcome is commensurate with the skill input being a win or loss.

18 Claims, 20 Drawing Sheets

424

425

VIDEO GAMING SYSTEM AND METHOD OF UTILIZING THE SAME

FIELD OF THE INVENTION

The embodiments of the present invention relate to a video gaming system incorporating a win or loss skill input configured to trigger associated game play commensurate with the win or loss outcome of the skill input.

BACKGROUND

Gaming continues to expand throughout the United States and worldwide. The primary area of growth in recent years relates to video machines (e.g., slot machines) and related electronic casino games (e.g., multi-player gaming devices). Indeed, video machines occupy a large majority of casino gaming floor space.

One relatively new area of legalized gaming incorporates skill inputs. That is, until recently, casino games of chance pitting players against the house have been based on random outcomes. Certain gaming jurisdictions, including Nevada, have now started to legalize games of chance incorporating a skill input or component. The payout associated with the skill input of the player may be completely dependent or partially dependent (e.g., quasi skill based) thereon.

Thus, it would be advantageous to develop new video systems and methods incorporating novel features, including skill components, to attract and retain players.

SUMMARY

The embodiments of the present invention are directed to a video gaming system and method for conducting a casino game of chance wherein a skill input by a player determines whether the game outcome will be a win or a loss. Once the skill input is evaluated, a game play (e.g., spinning slot reels) is activated whereby the outcome is commensurate with the skill input being a win or loss.

In one embodiment, the skill input relates to a digital board comprising a plurality of spaces which intermittingly display "Win" or "Lose" on each space. An outcome indicator intermittingly highlights one space at a time, indicating the current selected outcome. An input device, such as a button, allows the player to stop the intermittent display of Win or Loss outcomes and the outcome indicator to determine the game outcome. Once the Win or Loss outcome is determined by the skill input, a game play is displayed commensurate with the Win or Loss outcome.

In one embodiment of the present invention, a slot machine is configured with the skill component detailed herein. In such an embodiment, once the skill input determines a Win or Loss outcome, a plurality of slot reels activate and generate a Win or Loss outcome commensurate with the skill input.

In one embodiment, an amount of a Win outcome is randomly and intermittingly assigned to the Win outcome(s) on the digital board. In other words, in one embodiment, once every second or less, a new award amount is associated with the Win outcome(s) on the digital board such that when the player successfully stops the outcome indicator on the Win outcome, the award associated at that instance, is the award that the game play generates.

The system and method contemplate, as detailed herein, bonuses, non-monetary outcomes (e.g., free spins), and winning outcomes based solely on the game play independent of the skill input.

Other variations, embodiments and features of the present invention will become evident from the following detailed description, drawings and claims.

DETAILED DESCRIPTION

Figure 1:
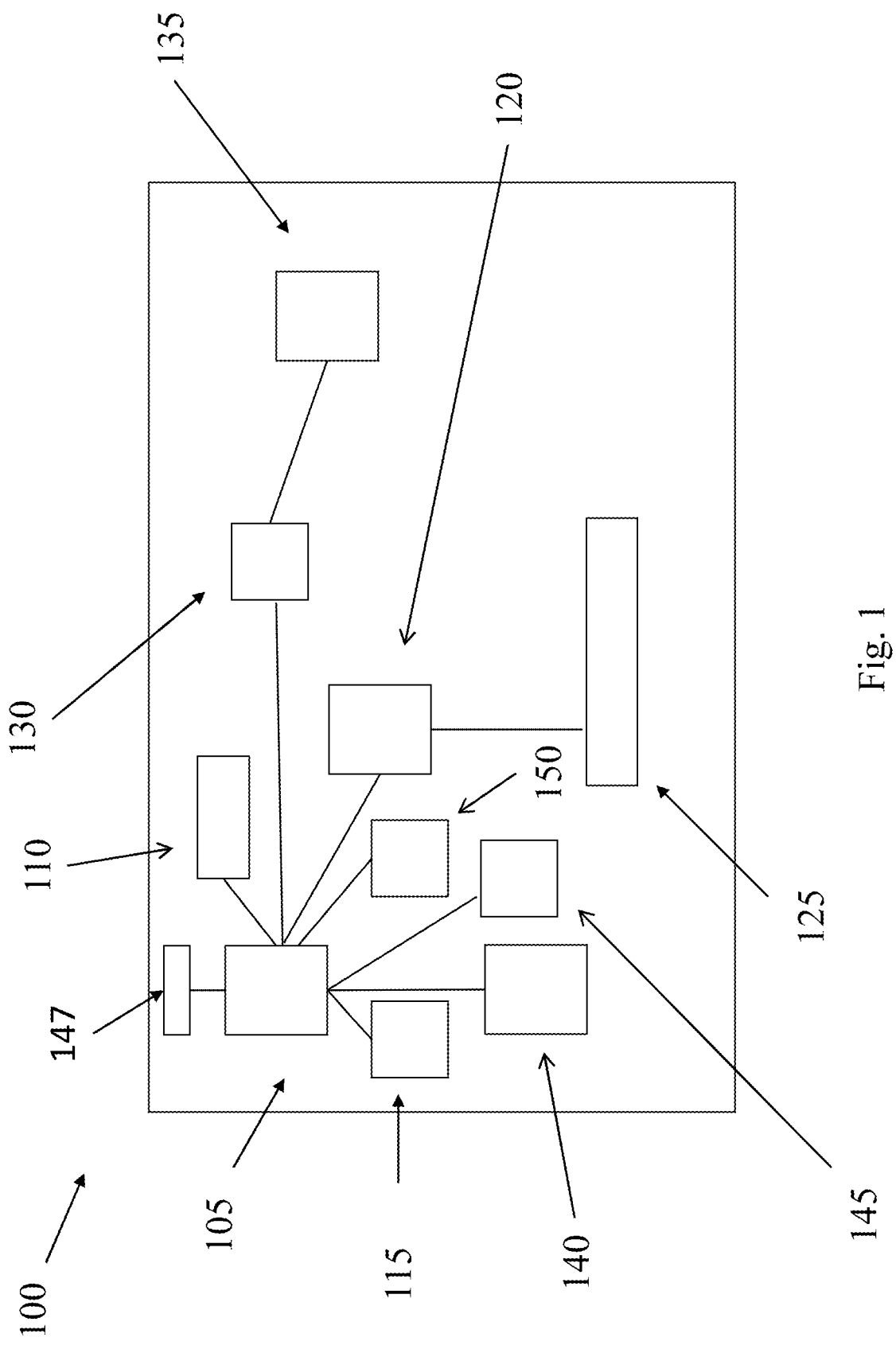
FIG. 1 illustrates a block diagram of components of an electronic gaming device for conducting a game according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

Those skilled in the art will recognize that the embodiments of the present invention involve both hardware and software elements which portions are described below in such detail required to construct and operate a game method and system according to the embodiments of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.), or an embodiment combining software and hardware. Further-more, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), and optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied thereon, for example, in baseband or as part of a carrier wave. Such a propagated signal may take any variety of forms, including, but not limited to, electromagnetic, optical, or any suitable combination thereof. A computer readable signal medium may be any computer readable medium that is not a computer readable storage medium and that can communicate, propagate, or transport a program for use by or in conjunction with an instruction execution system, apparatus, or device.

Program code embodied on a computer readable medium may be transmitted using any appropriate medium, including but not limited to wireless, wireline, optical fiber cable, RF and the like, or any suitable combination of the foregoing.

Computer program code for carrying out operations for aspects of the present invention may be written in any combination of one or more programming languages, including an object-oriented programming language such as Java, Smalltalk, C++ or the like or conventional procedural programming languages, such as the "C" programming language, AJAX, PHP, HTML, XHTML, Ruby, CSS or similar programming languages. The programming code may be configured in an application, an operating system, as part of a system firmware, or any suitable combination thereof. The programming code may execute entirely on the user's computer, partly on the user's computer, as a stand-alone software package, partly on the user's computer and partly on a remote computer or entirely on a remote computer or server as in a client/server relationship sometimes known as cloud computing. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagrams. As used herein, a "gaming device" should be understood to be any one of a general-purpose computer, as for example a personal computer or a laptop computer, a client computer configured for interaction with a server, a special purpose computer such as a server, or a smart phone, soft phone, tablet computer, personal digital assistant or any other machine adapted for executing programmable instructions in accordance with the description thereof set forth above.

The embodiments of the present invention may be facilitated by an electronic gaming device whereby a single player plays against the electronic gaming device's (or machine's) processor as described herein. The electronic gaming device may be a standalone device and bar-top device forming part of a gaming device network or not. A block diagram of the electronic gaming device 100 is shown in FIG. 1. The exemplary electronic gaming device 100 may include a central processing unit (CPU) also deemed a processor 105 which controls the electronic gaming device 100 based on instructions stored in program read-only memory (ROM) 110 and pay table ROM 115. Program ROM 110 stores executable instructions related to the operation of the gaming device 100 and which are generally permanent. CPU 105 may be connected to a video controller 120 which provides output to one or more video displays 125. Similarly, an audio controller 130 provides audio output as dictated by the CPU 105 through speakers 135. The aforementioned components and others may be attached to a circuit board forming a motherboard. In another embodiment, the electronic gaming device 100 may be linked to a central game server which allows players to select from a number of games via the electronic gaming device 100. In such an embodiment, one or more processors integrated into the central server control the gaming device 100 based on instructions stored in program ROM 110.

A user interface 140 may respond to buttons on button panel or display incorporating touch screen technology or any other devices providing means for users to communicate with, and instruct, the electronic gaming device 100. Wager memory 145 stores an amount of money/credits deposited into the electronic gaming device 100 by a player and specific wager information related to each play of the electronic gaming device 100. A bill validator 147 is configured to read currency and tickets. Payout system 150 includes a coupon printer or similar device for receiving money/coupon from the electronic gaming device 100.

Those skilled in the art will recognize that the configuration and features of the electronic gaming device 100 disclosed herein are exemplary and may be altered in any number of ways without impacting the embodiments of the present invention.

Figure 2:
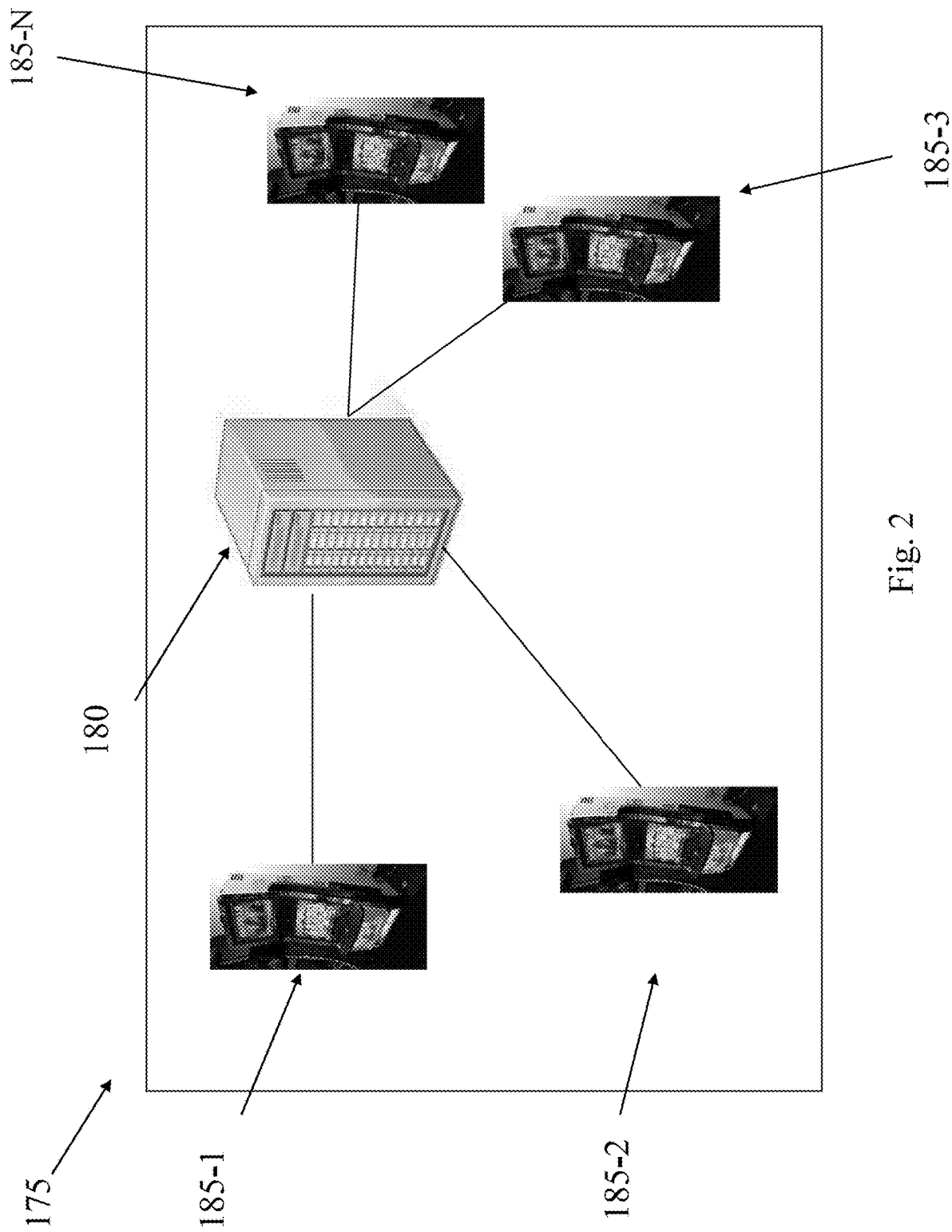
FIG. 2 illustrates a block diagram of a wireless network system including numerous slot machines according to the embodiments of the present invention.

FIG. 2 shows a block diagram of a gaming network 175 which may be used to facilitate play of the game via linked gaming devices according to the embodiments of the present invention. The gaming network 175 comprises a central processor 180 (e.g., processor-equipped game server) in communication with multiple gaming devices 185-1 through 185-N as described in FIG. 1.

Figure 3:
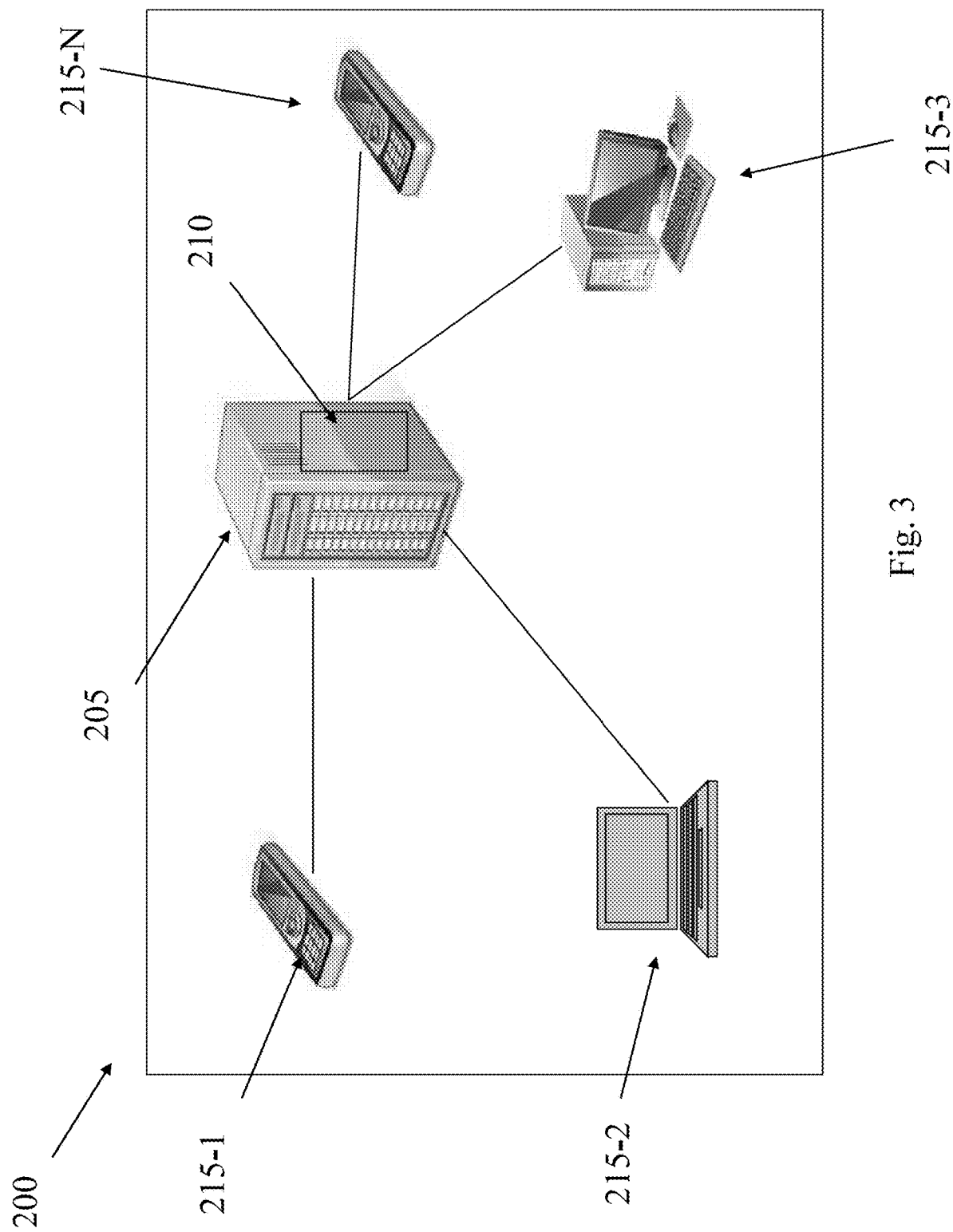
FIG. 3 illustrates a block diagram of a wireless network system accessible by mobile devices for conducting mobile games of chance according to the embodiments of the present invention.

FIG. 3 shows a block diagram of a wireless system 200 which may be used to facilitate remote play of the game according to the embodiments of the present invention. The wireless network system 200 comprises a processor-equipped game server 205, including one or more processors 210 running game software, and remote devices 215-1 through 215-N (e.g., smart phones) configured to access said game server 205 facilitating game play on the remote devices 215-1 through 215-N. In another embodiment, the video game according to the embodiments of the present invention may be in the form of a software application ("App") downloadable onto smart phones, tablets or computers and playable via processing power and a user interface associated therewith.

The detailed description below focuses on an embodiment wherein the underlying game play is based on a slot game. Those skilled in the art will recognize that the system and method disclosed herein may use any underlying game type, including video poker, keno, bingo, etc., to display the Win or Loss outcome determined by the skill input.

Figure 4:
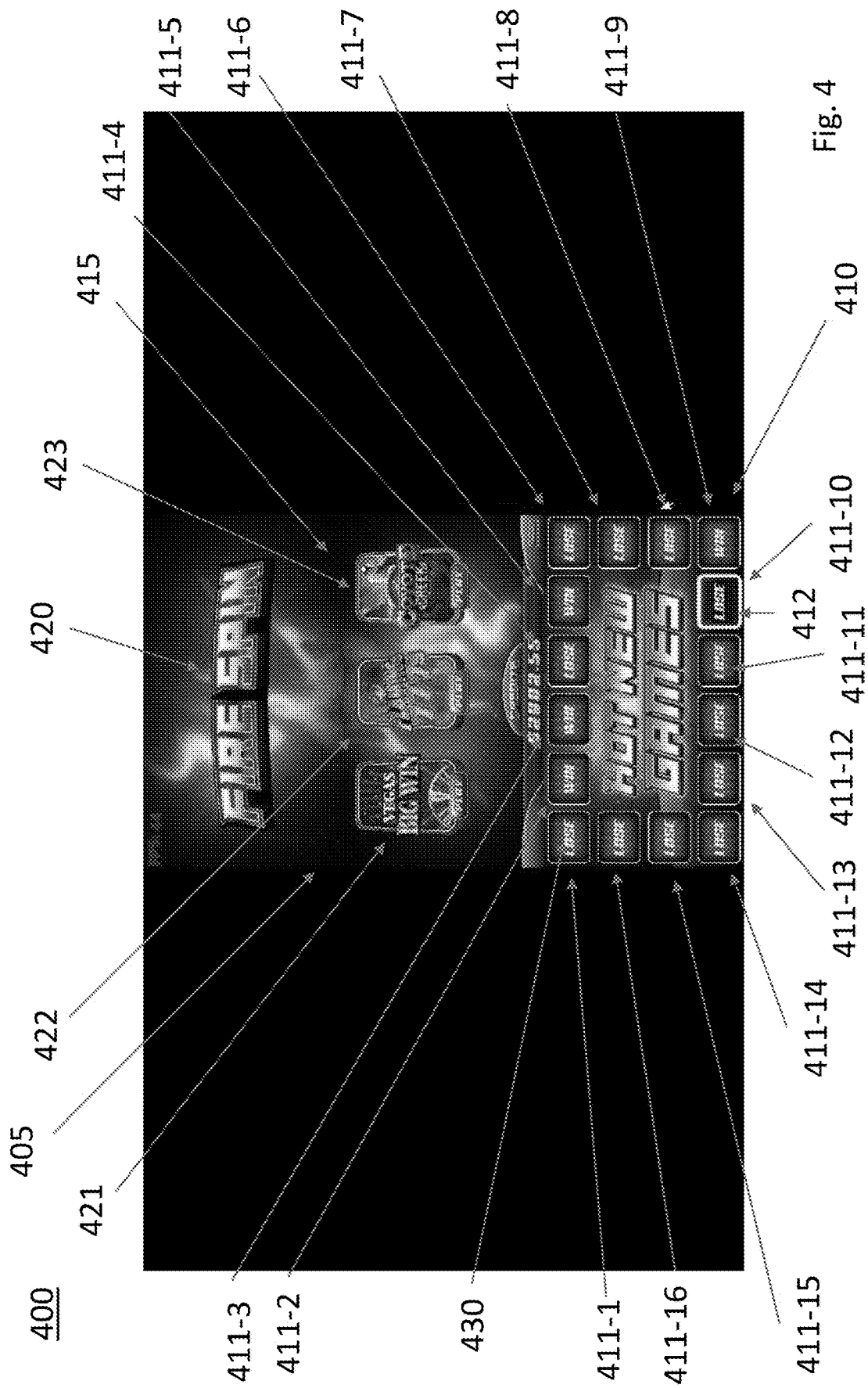
FIG. 4 illustrates an exemplary attraction/idle screen of an electronic gaming device according to the embodiments of the present invention.

FIG. 4 shows an exemplary attraction or idle screen 405 of an electronic gaming device 400 according to the embodiments of the present invention. As shown, the electronic gaming device 400 includes a skill interface 410, game selection area 415 and game branding area 420 (in this instance branded as Fire Spin). Upon approaching the electronic gaming device 400, the player first selects the game to be played. As shown, the player can select amongst Vegas Big Win 421, Flaming 777s 422 or Coyote Creek 423. Obviously, other slot style games may be available for the player to choose from.

In this embodiment, the skill interface 410 comprises sixteen rectangular spaces 411-1 through 411-16. Those skilled in the art will recognize that more or less than sixteen spaces may be utilized and the spaces may take on any shape and dimension. Each space 411-1 through 411-16 includes a display 430 on which the word Win or Lose is randomly and intermittingly depicted. In one embodiment, the Win or Lose terms may change in each space 411-1 through 411-16 in a pre-established pattern or randomly according to a random number generator or similar software- and/or hardware-based randomizer. Each space 411-1 through 411-16 further includes an outcome indicator 412 in the form of circumferential light. Those skilled in the art will recognize that the outcome indicator 412 need not be a circumferential light 412. For example, the display 430 may change color, the Win or Lose term may illuminate or a mark adjacent to each space 411-1 through 411-16 may illuminate to signify a Win or Loss. Indeed, any manner of visually indicating which space 411-1 through 411-16 determines the game outcome maybe utilized.

Figure 5:
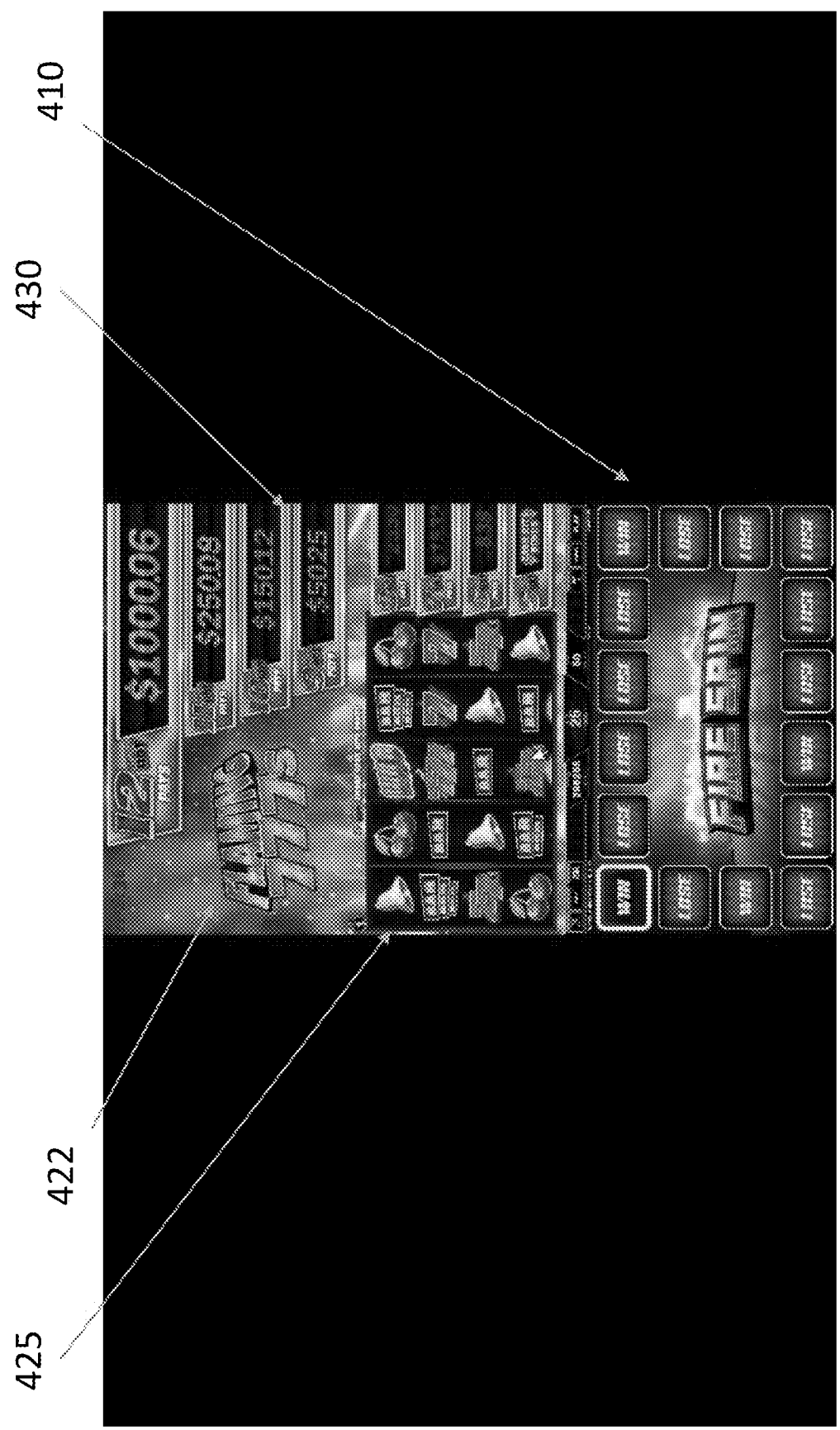
FIG. 5 illustrates an exemplary front view associated with a selected game playable on the electronic gaming device according to the embodiments of the present invention.
Figure 11:
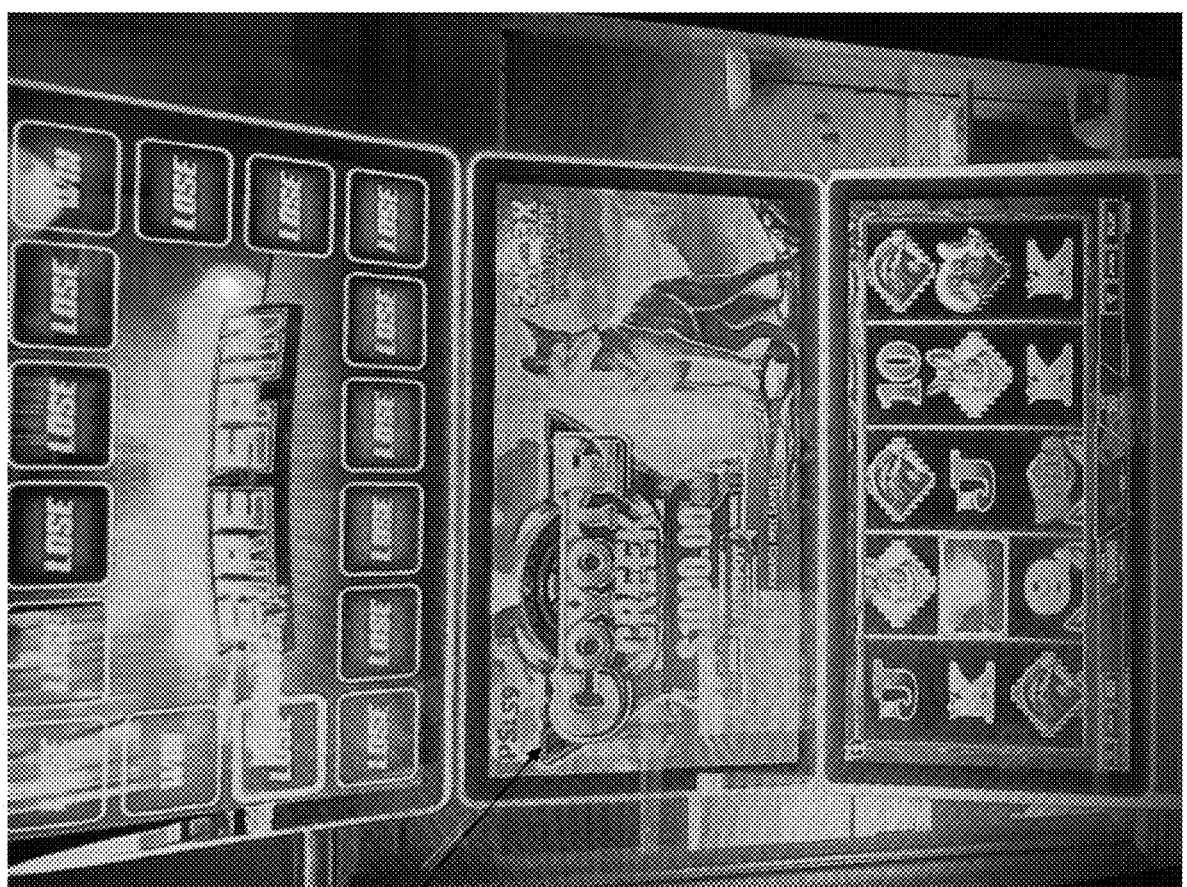
FIG. 11 illustrates an exemplary home screen associated with another selected game playable on the electronic gaming device according to the embodiments of the present invention.

FIG. 5 shows an exemplary front view 406 of an electronic gaming device 400 according to the embodiments of the present invention after the player has selected to play Flaming 777s 422. FIG. 11 shows a Coyote Creek 423 embodiment. Once the game selection is made, the electronic gaming device 400 now shows the skill interface 410, a game play window 425 associated with the selected game and payout area 430 associated with the game selected. In this instance, the payout area 430 extends from a top portion of the electronic gaming device 400 to a position adjacent to the game play window 425. The skill interface 410, a game play window 425 associated with the selected game and payout area 430 associated with the game selected may all be on a single display or two or three individual displays.

Figure 6A:
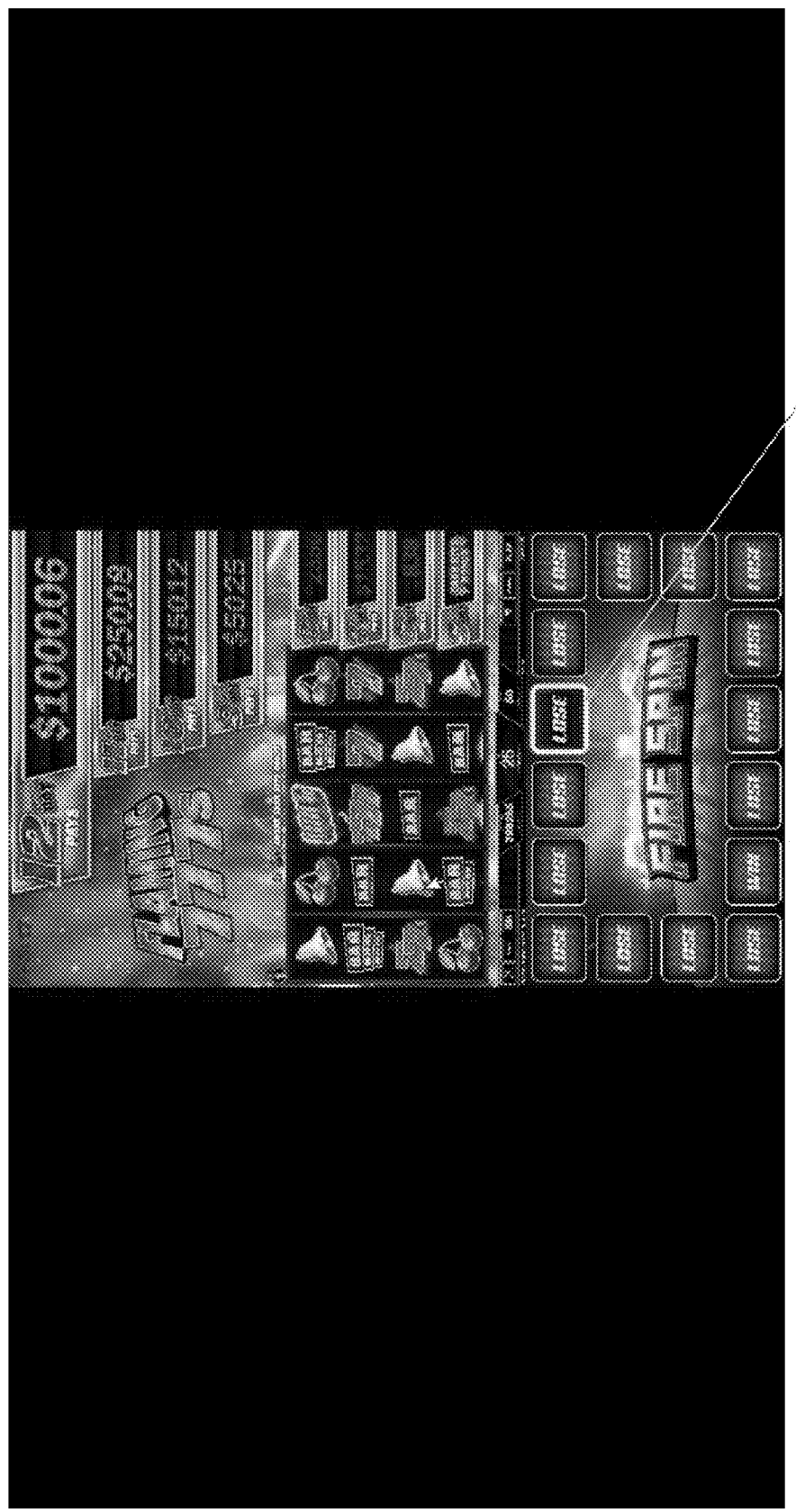
FIGS. 6A through 6C illustrate movement of an outcome indicator of an electronic gaming device according to the embodiments of the present invention.
Figure 6B:
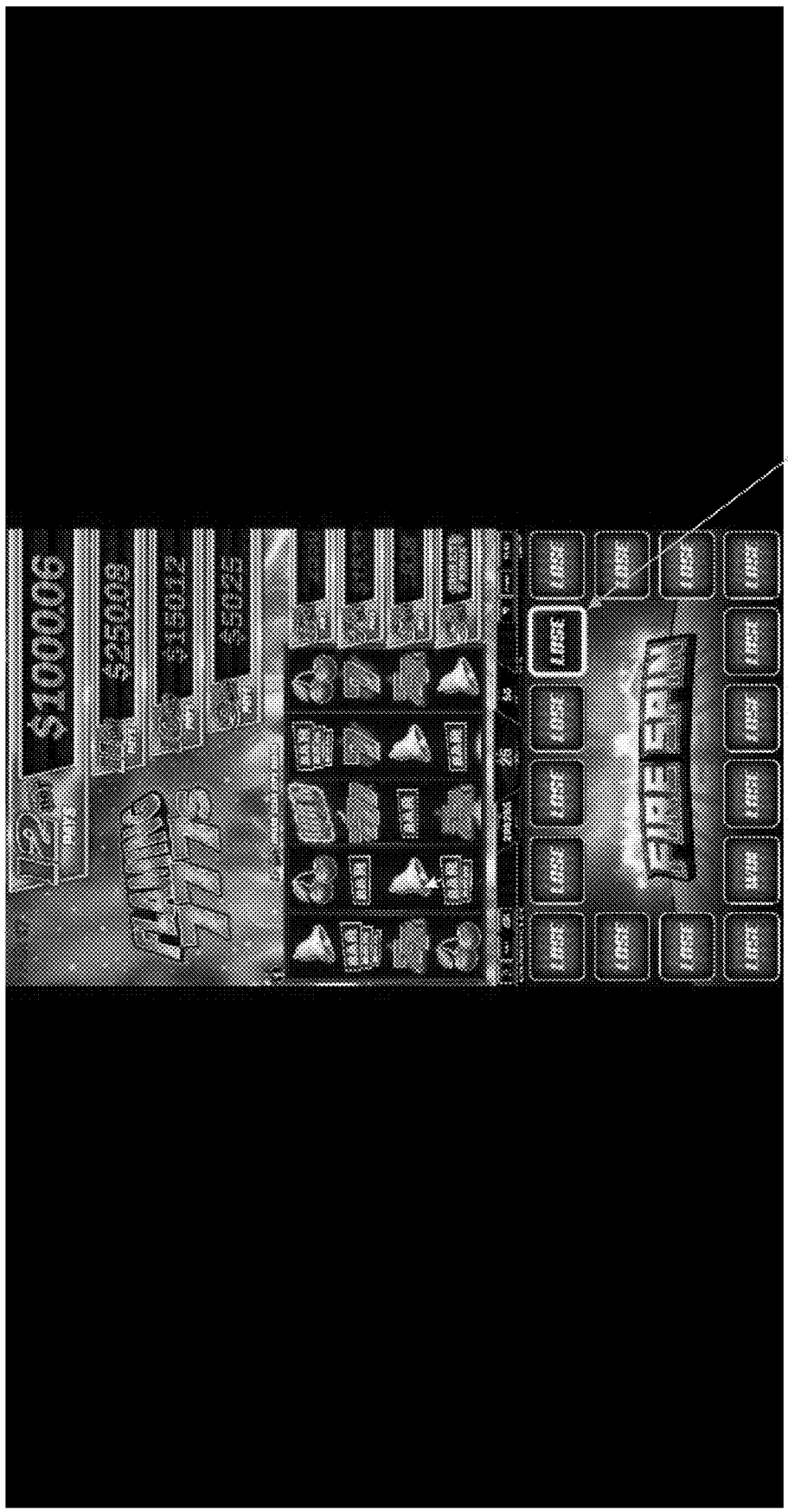
Figure 6C:
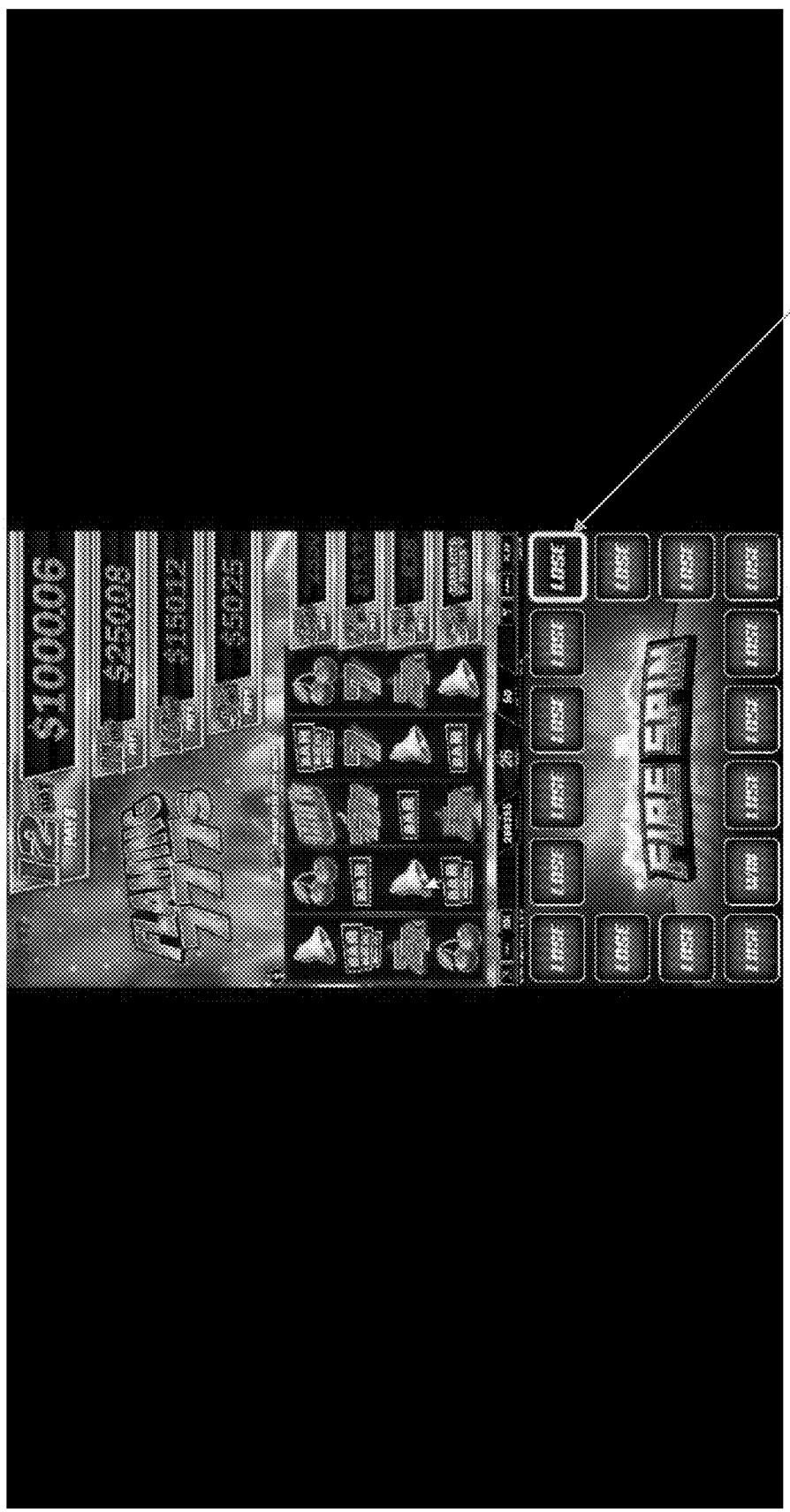

As shown in FIGS. 6A through 6C, simultaneously, as the Win and Loss terms are intermittingly changing in the spaces 411-1 through 411-16, the outcome indicator 412 is moving from space to space highlighting a single space 411-1 through 411-16. The timing of the Win and Loss terms changing and the outcome indicator 412 moving from space to space may be coordinated, random or offset. For example, in an offset embodiment, the Win and Loss terms may change, if at all, every second while the outcome indicator 412 moves from one space to a next space (e.g., adjacent space), every ½ second. The timing of Win and Loss terms changing and the outcome indicator 412 moving from space to space may be adjusted to make the game more or less challenging for the player. In one embodiment, the outcome indicator 412 moves in a pattern (e.g., from one space to an adjacent space in a clockwise or counter-clockwise fashion or every other space, etc.) or moves randomly amongst the spaces. Like the timing of the Win and Loss terms changing and the outcome indicator 412 moving from space to space, the manner in which the outcome indicator 412 moves may be adjusted to make the game more or less challenging for the player.

Figure 7A:
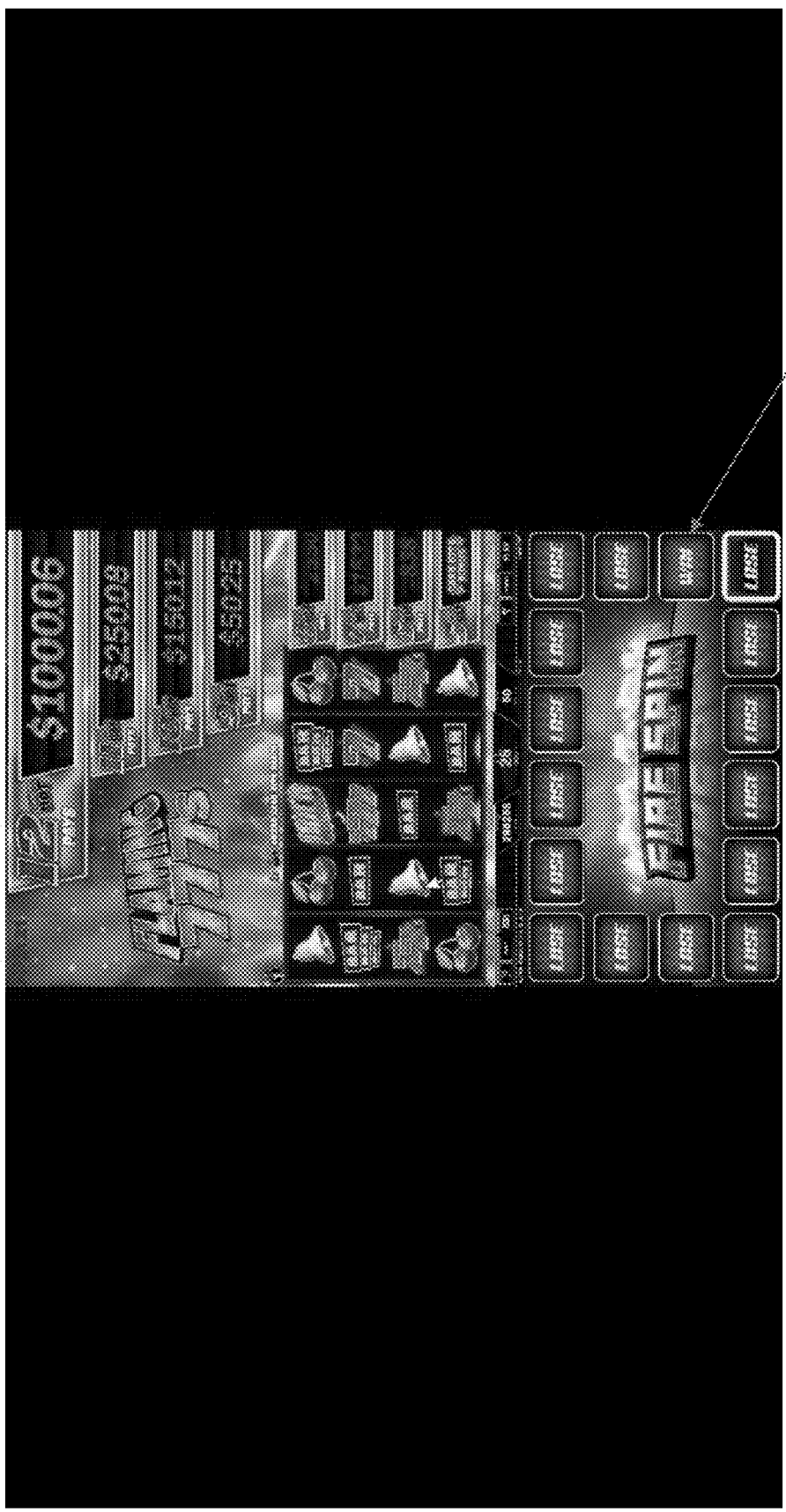
FIGS. 7A and 7B illustrate Win and Loss outcomes changing according to the embodiments of the present invention.
Figure 7B:
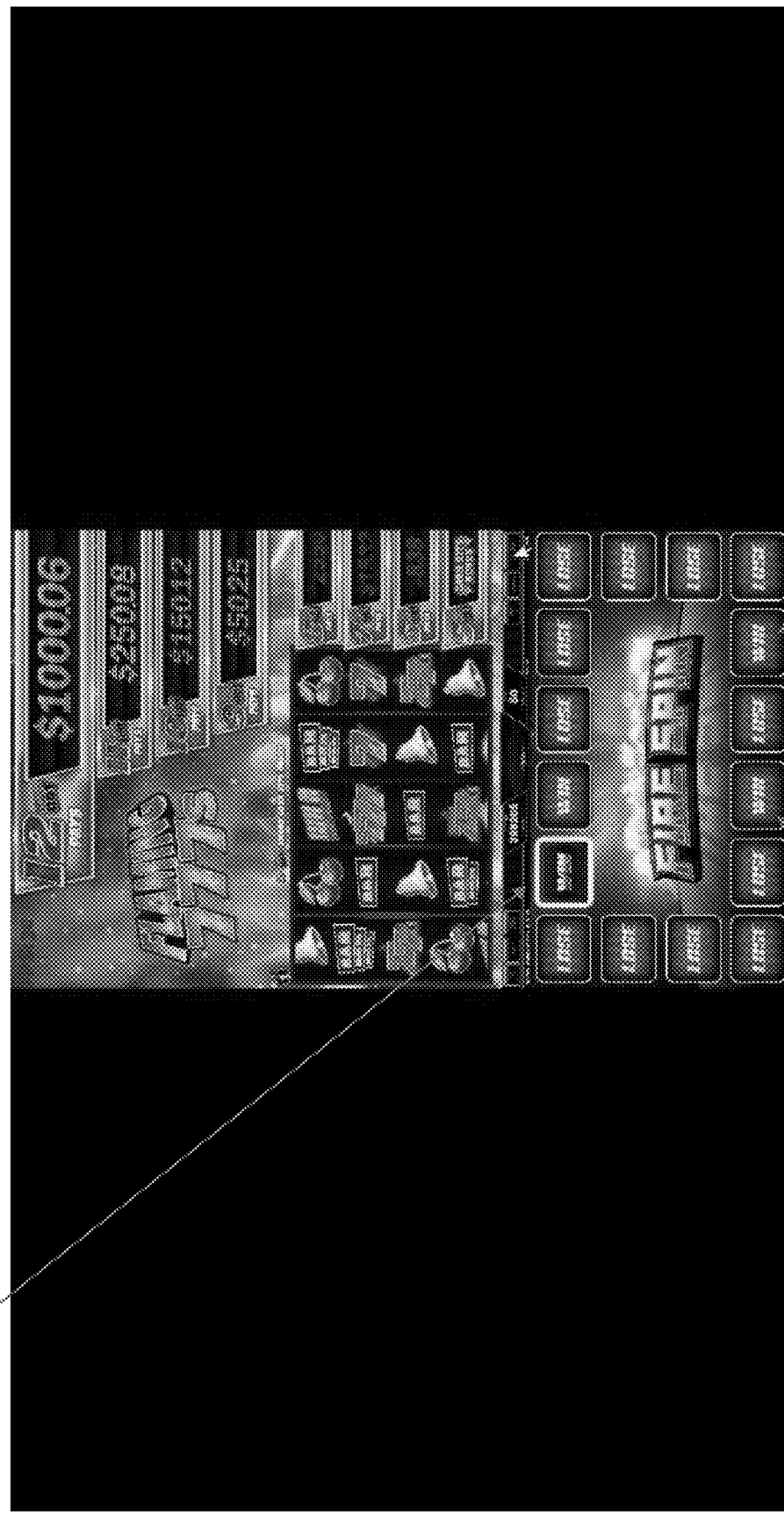

FIGS. 7A and 7B show spaces changing Win and Loss depictions. As shown in FIG. 7A, space 411-8 shows a Win depiction while in FIG. 7B spaces 411-2, 411-10 and 411-12 show Win depictions.

Figure 8:
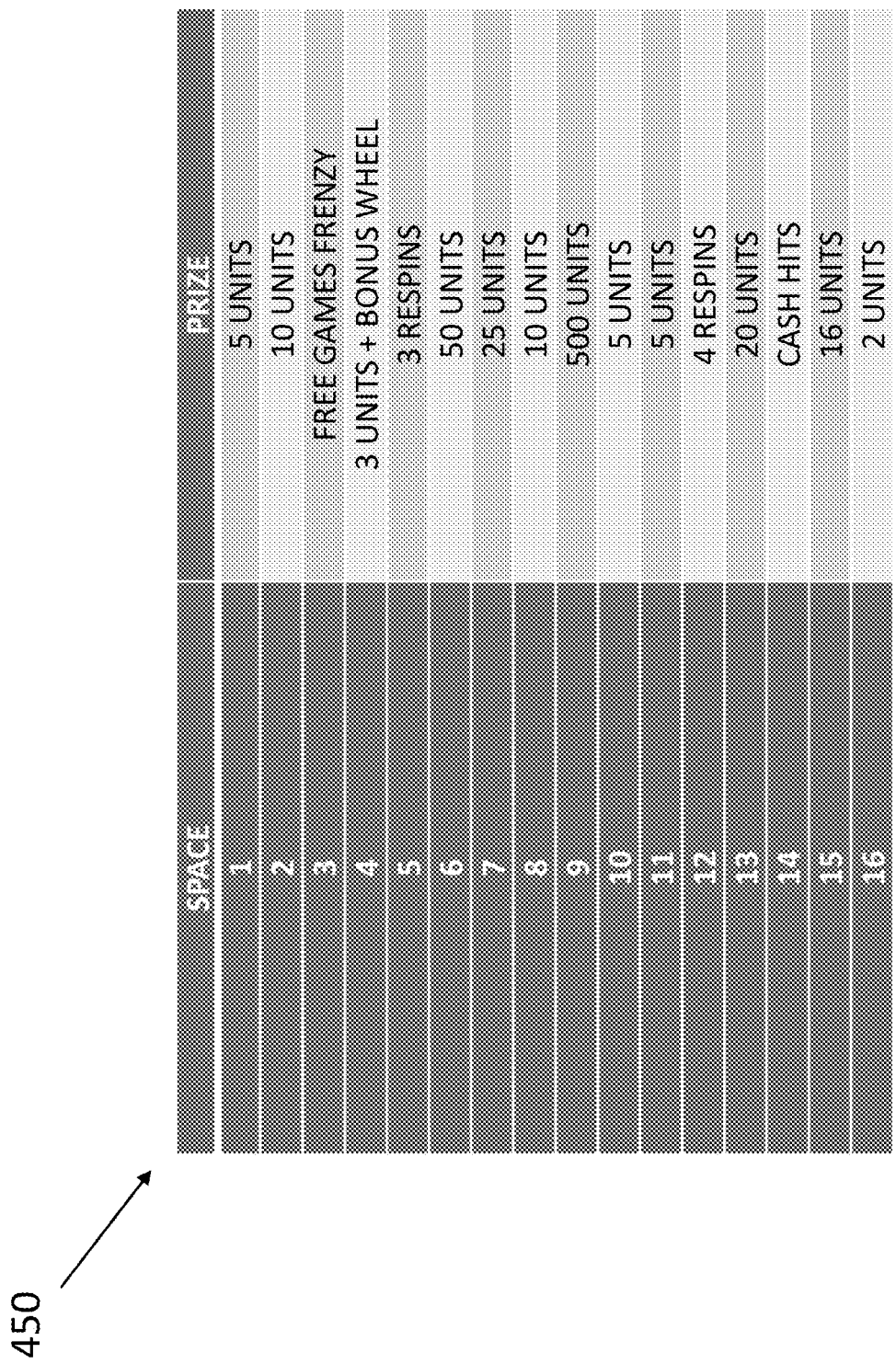
FIG. 8 illustrates a prize model according to the embodiments of the present invention.
Figure 9A:
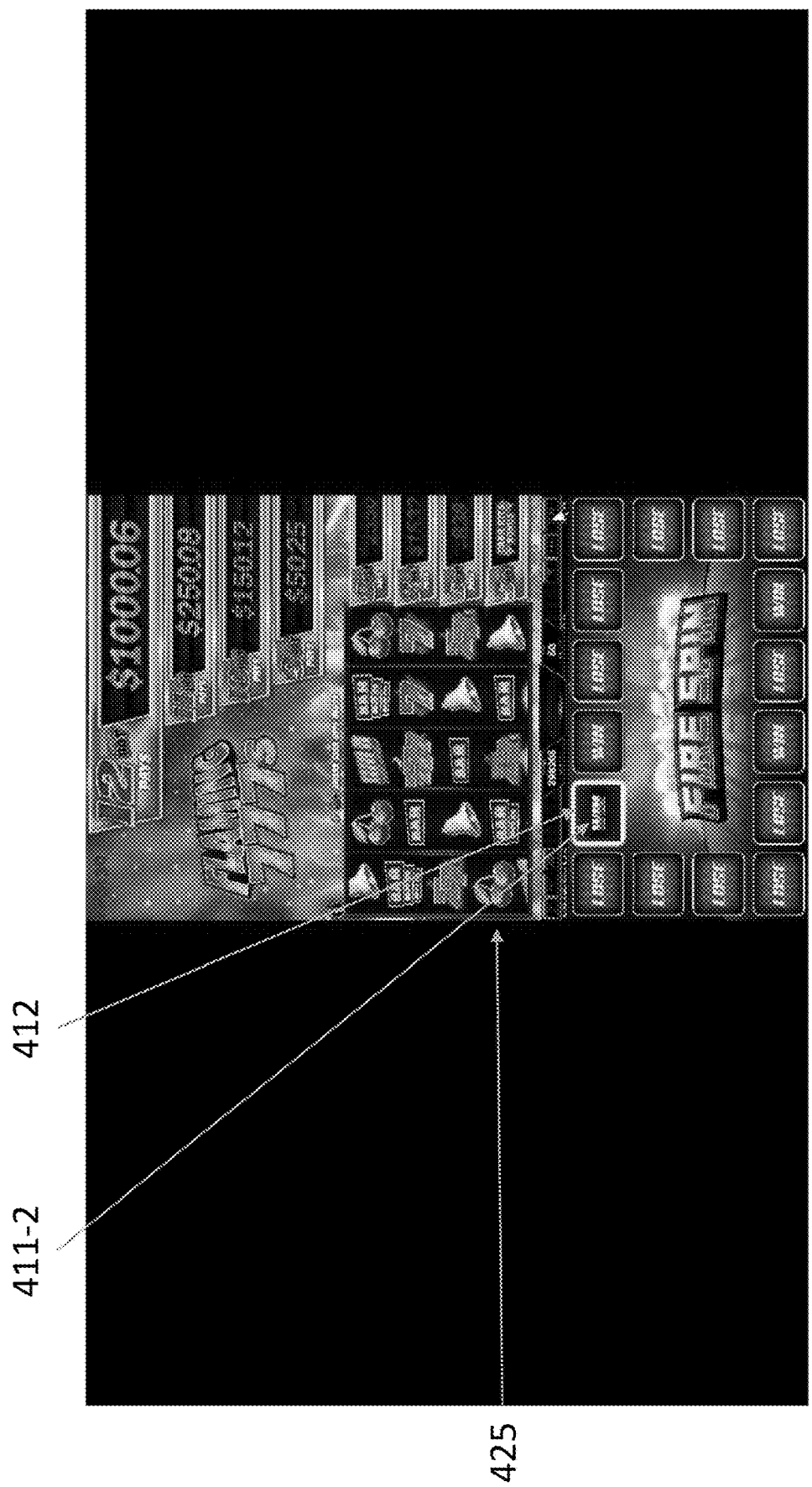
FIGS. 9A through 9G illustrate a Win outcome and associated game play according to the embodiments of the present invention.
Figure 9B:
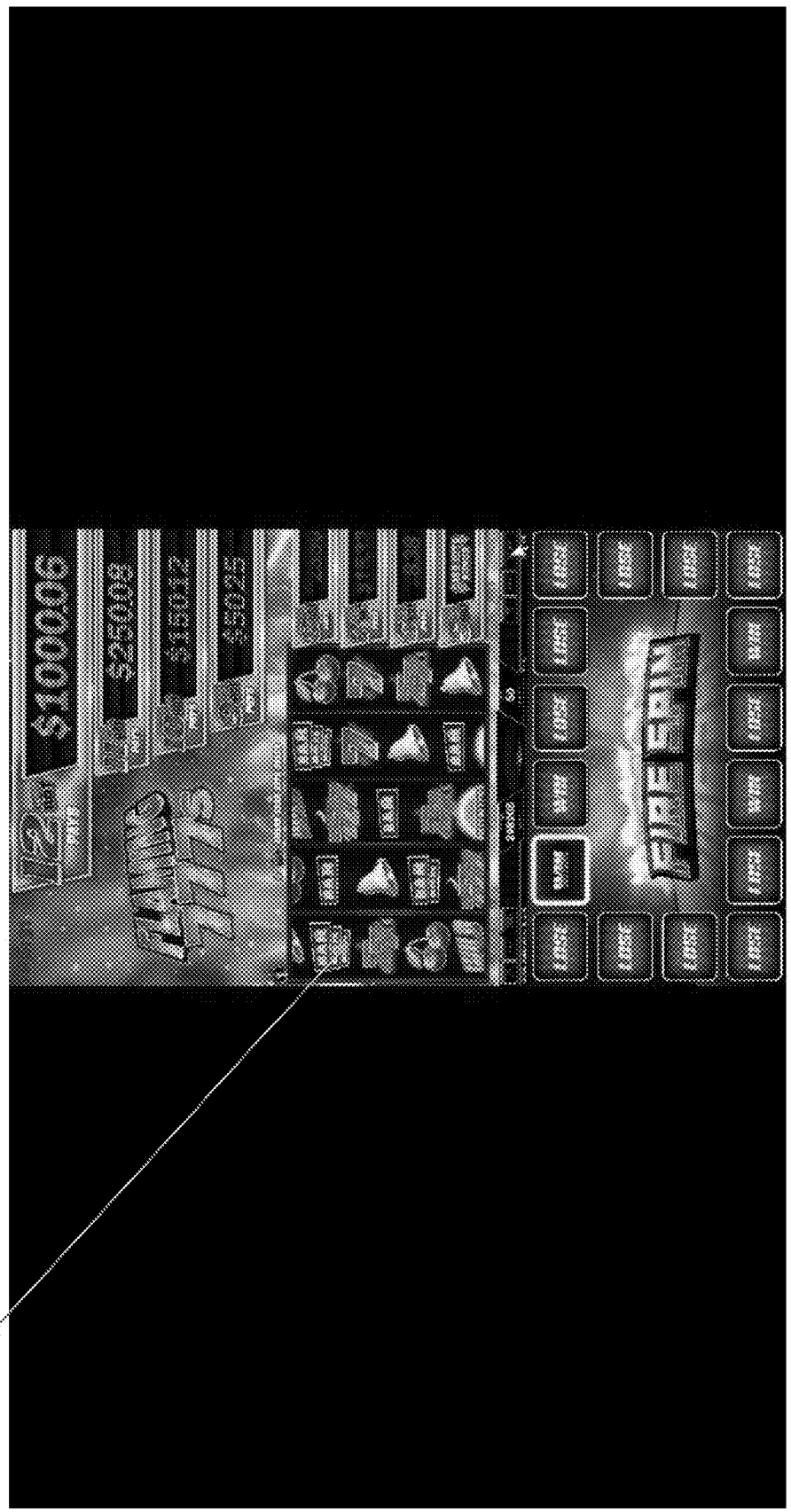
Figure 9C:
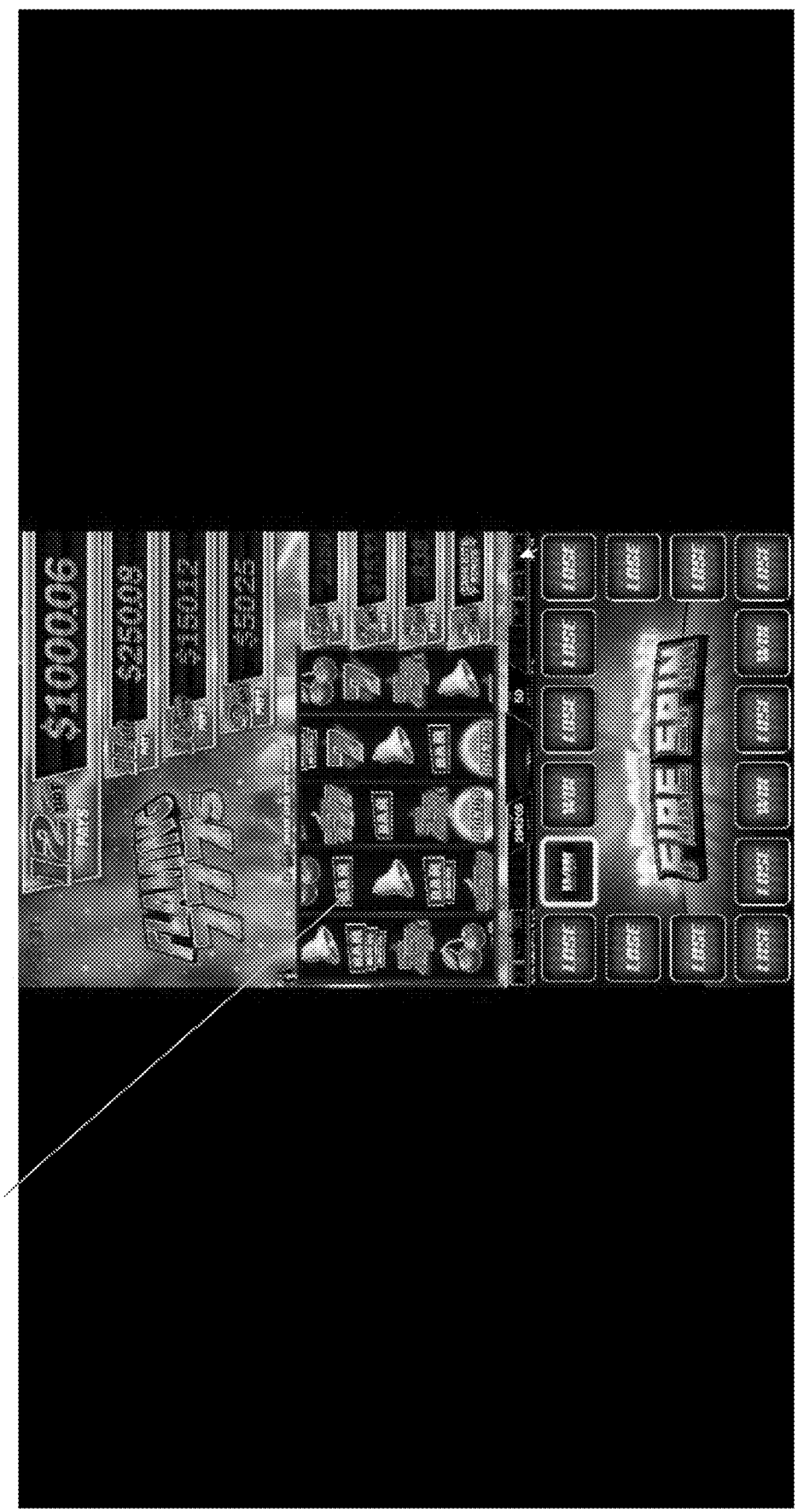
Figure 9D:
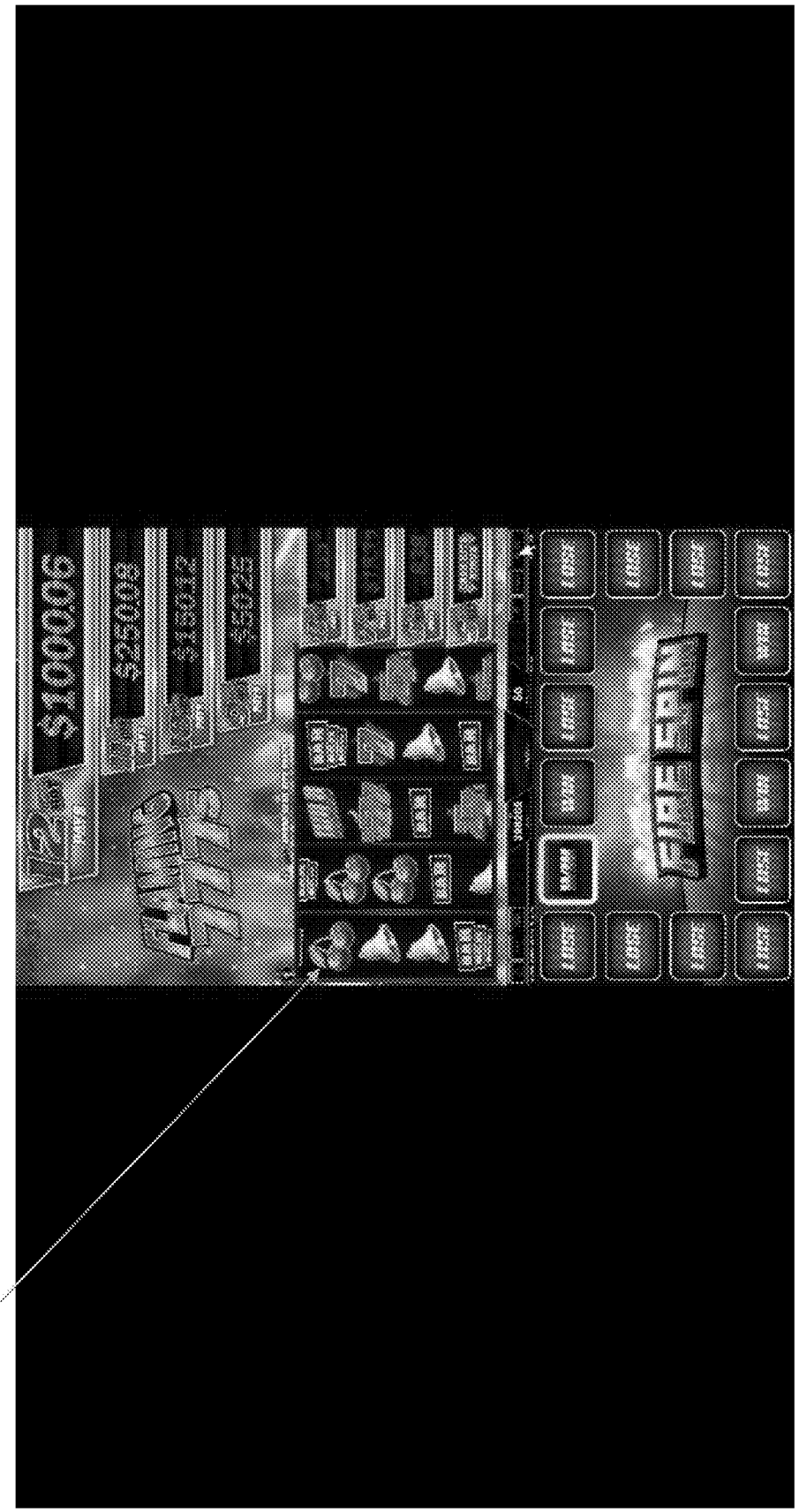
Figure 9E:
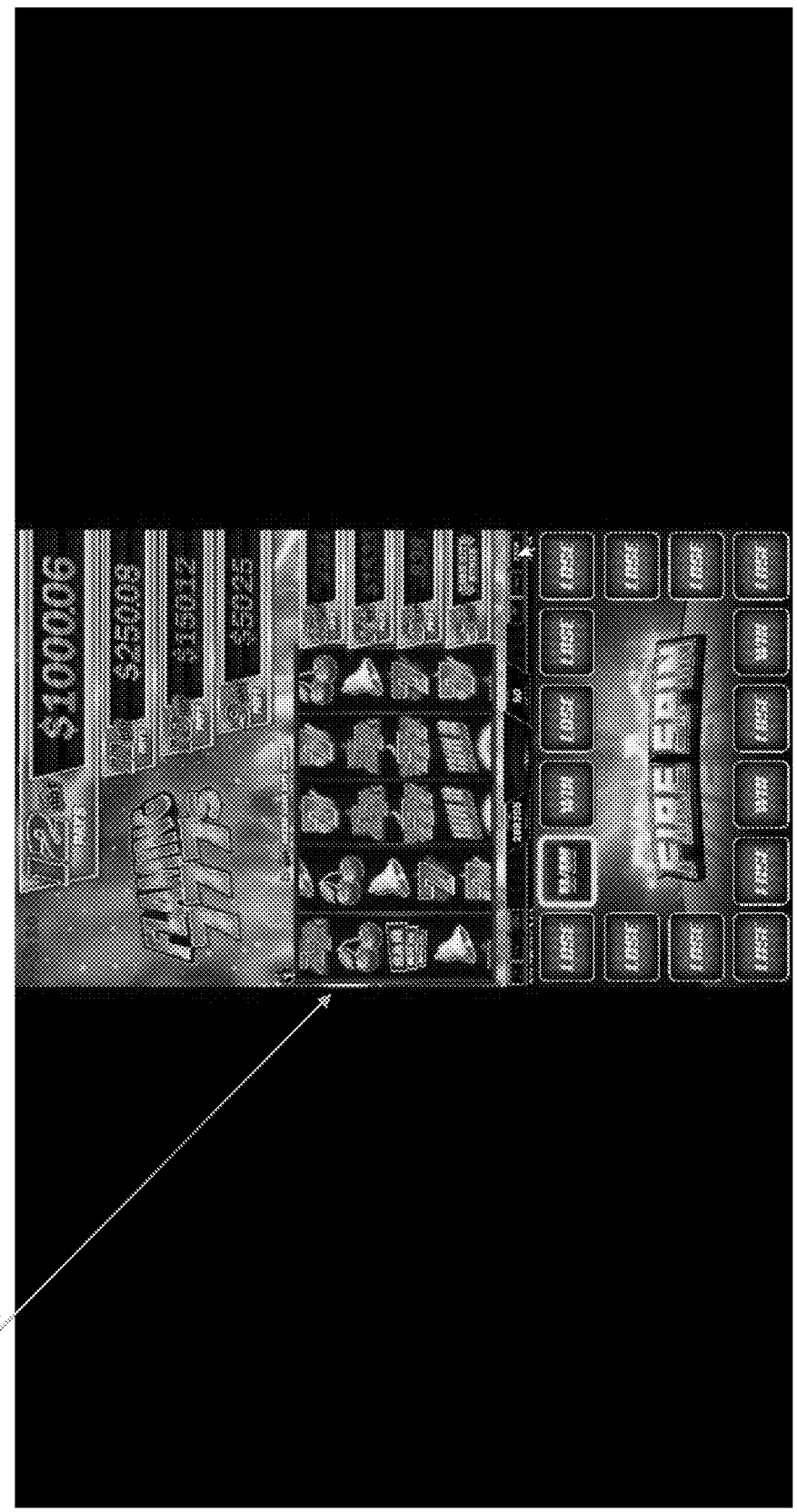
Figure 9F:
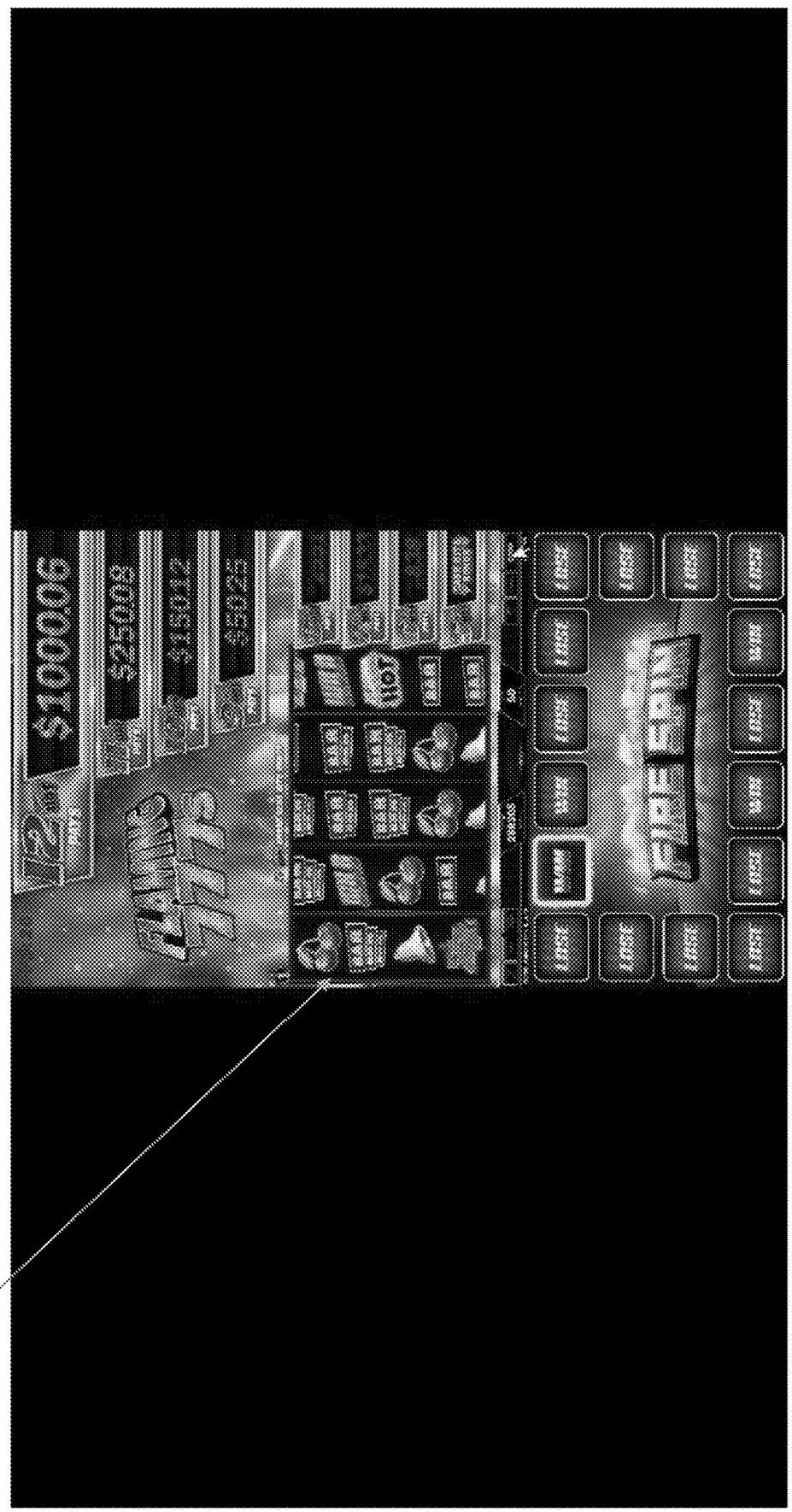
Figure 9G:
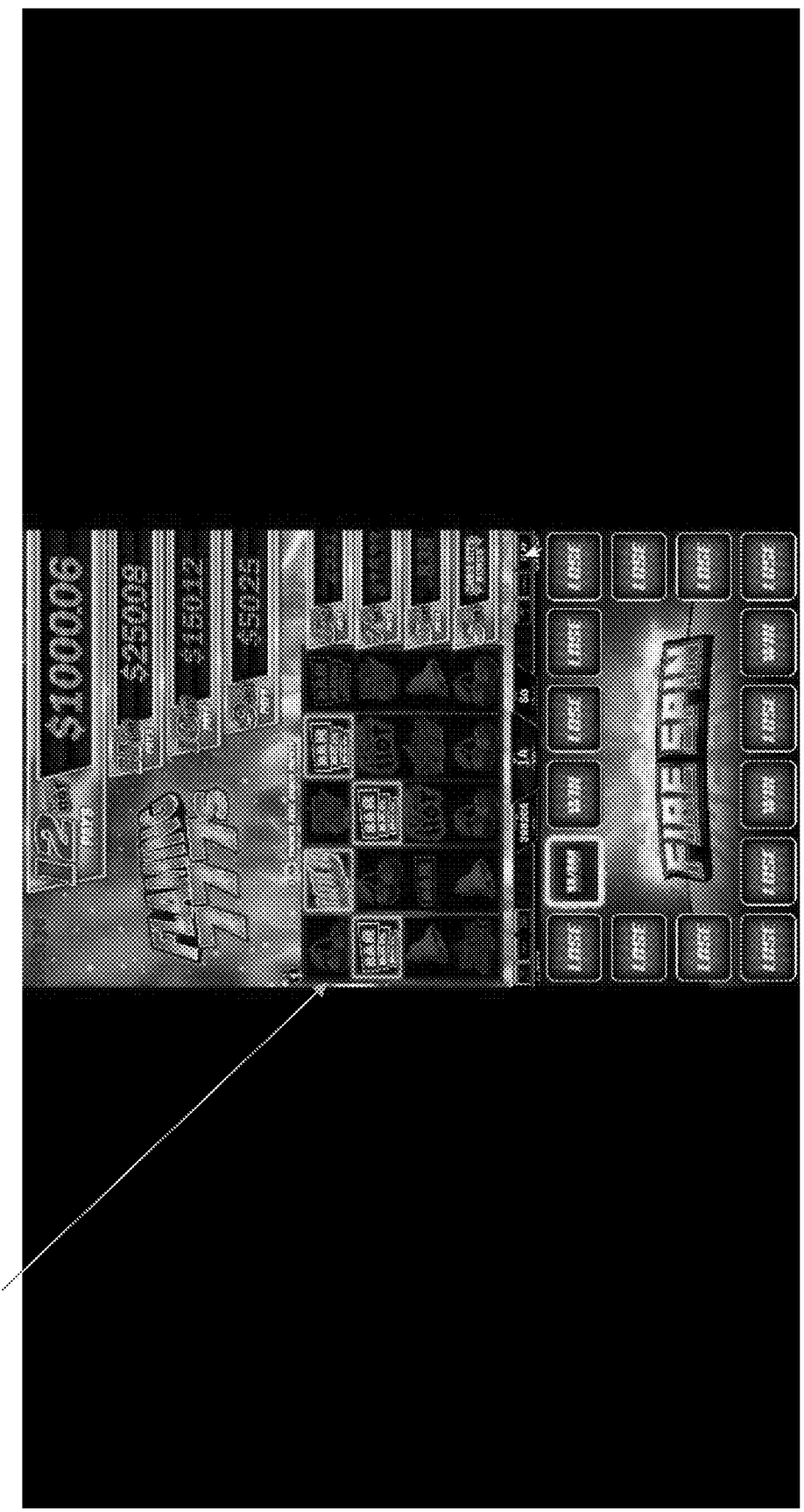

In one embodiment, prizes are associated with the spaces 411-1 through 411-16. In such an embodiment, the system generates a prize model 450 that is mapped onto the sixteen spaces 411-1 through 411-16. In one embodiment a new prize model 450 is generated and mapped onto the sixteen spaces 411-1 through 411-16 every second or less. FIG. 8 shows an exemplary prize model 450 including possible prizes including monetary awards, free plays, bonus wheel and cash hits. Any conceivable prize may be mapped onto the spaces 411-1 through 411-16.

FIGS. 9A through 9G illustrate a Win outcome and associated game play according to the embodiments of the present invention. Once the skill input results in the outcome indicator 412 identifying the space 411-2 depicting a Win, the game play is activated to generate an outcome 417 commensurate with the prize mapped onto the winning space. For example, if the prize model indicates that space 2 is associated with a prize of 25 units, the video slots will activate and generate a winning outcome corresponding to an award of 25 units. While the player knows that he or she has won when the outcome indicator 412 identifies a winning space, the player does not know the prize such that the game play remains exciting. Alternatively, in another embodiment, the player may be notified of the prize as soon as the outcome indicator 412 identifies a winning space. FIGS. 9B-9G show the game play window 425 displaying a game play in the form of a slot style game (i.e., spinning reels which ultimately stop to generate an outcome (see FIG. 9G) a prize commensurate with the prize associated with space 411-2).

Figure 10:
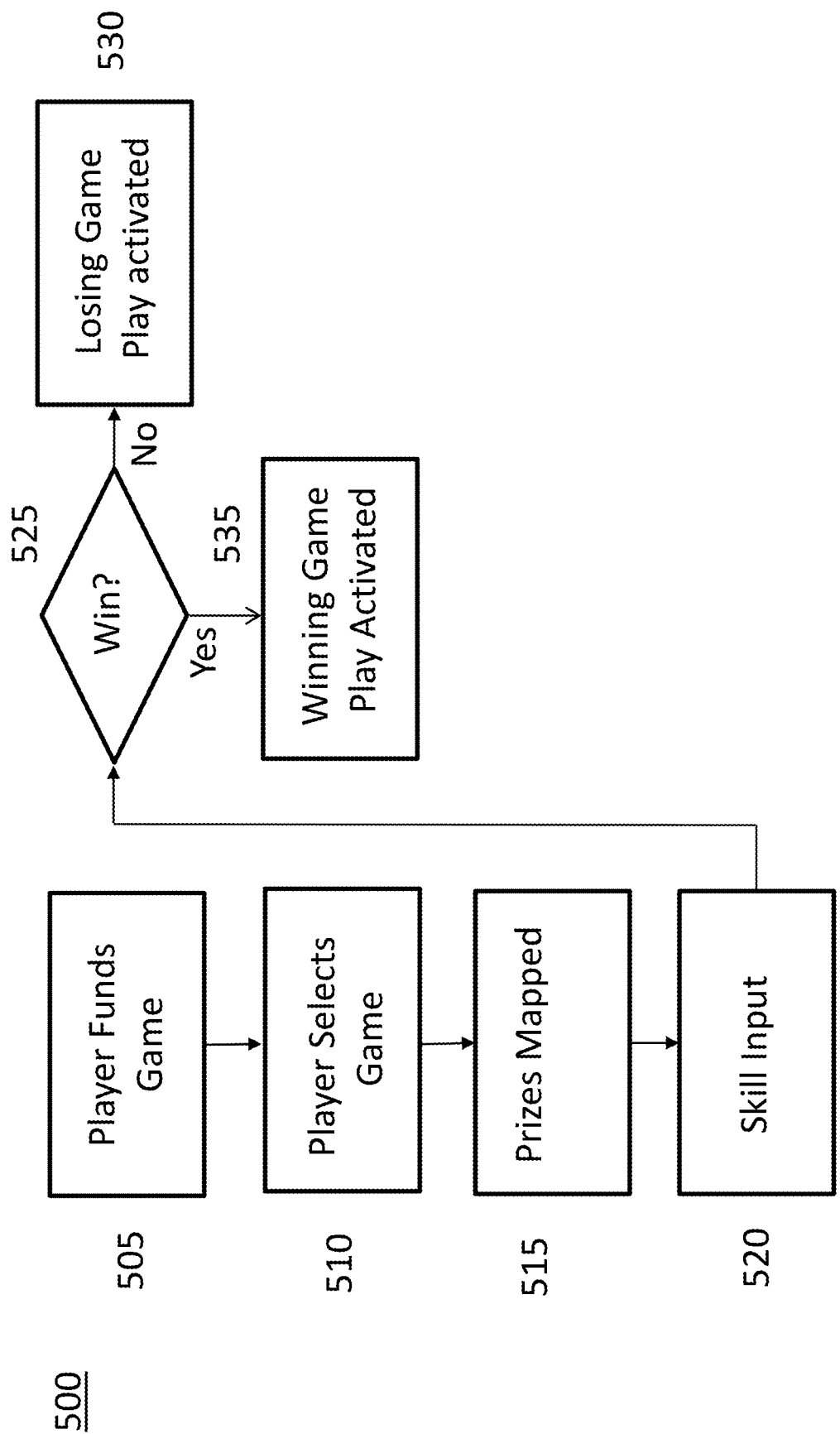
FIG. 10 illustrates a flow chart detailing a methodology according to the embodiments of the present invention.

FIG. 10 shows a flow chart 500 detailing a methodology for conducting a game according to the embodiments of the present invention. At 505, the game is funded using currency or gaming tickets which are converted into gaming machine device credits. At 510, the player selects a game. In another embodiment, the electronic gaming device only supports one game such that the player need not select a game to play. At 515, prizes are continuously mapped to spaces 411-1 through 411-16 on the digital board. In one embodiment, the prize mapping process continues while the game is idle as well. At 520, the player uses the skill interface (e.g., button or touch screen icon) to stop the outcome indicator 412. At 525, it is determined if the player input results in the outcome indicator 412 identifying a winning outcome. If not, at 530, a losing game play is activated. If so, at 535, a winning game play is activated wherein the prize is commensurate with the prize mapped at 515.

Besides monetary prizes, the embodiments of the present invention envision a Respin feature. In one such embodiment, a Respin symbol appears on the 3rd reel and initiates the Respin Feature so that reels 1, 2, 4, and 5 respin. In one embodiment, the Respin feature may repeat up to 5 times, or until a winning game occurs. Another embodiment includes a Wheel Bonus during which Mini, Minor, Major and Grand award the amounts shown on screen multiplied by the line bet plus a progression. Another embodiment contemplates a random bonus triggered after a game that had a win less than or equal to the minimum play level the bonus increases the win up to 1000×. Another embodiment includes a Free Game Frenzy where 10 to 50 free games are awarded. In another embodiment, a Cash Hits feature renders the player eligible for progressive payouts. Regardless of the game play game type, the prizes may be monetary or non-monetary and take any form.

While a slot game is detailed above, other game types may benefit from the embodiments of the present invention. For example, with a video poker game, the skill input can trigger a losing video poker outcome or a winning video poker outcome. It is also evident that the outcome indicator may highlight multiple spaces 411-1 through 411-16 and multiple spaces 411-1 through 411-16 may depict Win.

Although the invention has been described in detail with reference to several embodiments, additional variations and modifications exist within the scope and spirit of the invention as described and defined in the following claims.

I claim:

1. A computer-implemented gaming device comprising:
    a monetary input device configured to receive a physical item associated with a monetary value;
    a user interface configured to:
        enable a player to select a wager for a first casino game and enable the player to initiate a cash out operation;
    at least one processor executing computer-readable instructions related to the first casino game, said at least one processor being programmed by the computer-readable instructions to:
        add said monetary value to a credit balance for said player;
        deduct said selected wager from said credit balance; and
        decrease said credit balance in response to said cash out operation:
    a display device configured to depict said first casino game in video format;
    a memory device in communication with said at least one processor, said memory device storing said computer-readable instructions;
    a skill input interface configured to receive an input from a player,
    a digital board comprising a plurality of spaces, each of the plurality of spaces depicting a win indicia or a lose indicia thereon, wherein the win indicia or the lose indicia on each of the plurality of spaces intermittingly and graphically switch between one another, and wherein the win indicia relates to a winning game outcome and the lose indicia relates to a losing game outcome; and
    wherein said processor is further programmed by the computer-readable instructions to:
    (i) receive the input via said skill input interface causing an outcome indicator to highlight at least one of said plurality of spaces to identify a player-selection of either a win indicia or a lose indicia on the at least one of said plurality of spaces at a time of said input via said skill input interface; and
    (ii) display a game play of a second casino game having an outcome commensurate with said player-selection, wherein the outcome of the second casino game in response to said player-selection of the win indicia results in an award amount added to the credit balance.

2. The computer-implemented gaming device of claim 1 wherein the skill input interface is a button or touch screen.

3. The computer-implemented gaming device of claim 1 wherein said plurality of spaces comprises sixteen spaces depicting the win indicia or the lose indicia thereon.

4. The computer-implemented gaming device of claim 1 wherein the processor s further programmed by the computer-readable instructions to cause prizes to be mapped onto said plurality of spaces.

5. The computer-implemented gaming device of claim 1 wherein said outcome indicator moves from space to space of said plurality of spaces.

6. The computer-implemented gaming device of claim 1 wherein said second casino game is based on a slot style game.

7. A computer-implemented method comprising:
    receiving, by a monetary input device, a physical item associated with a monetary value;
    utilizing a user interface to:
        enable a player to select a wager for a first casino game and enable the player to initiate a cash out operation;
    performing, by at least one processor executing computer-readable instructions related to the first casino game, steps comprising:
        adding said monetary value to a credit balance for said player;
        deducting said selected wager from said credit balance; and
        decreasing said credit balance in response to said cash out operation;
    displaying, by a display device, a depiction of said first casino game in video format;
    storing, by a memory device in communication with said at least one processor, said computer-readable instructions;
    utilizing a skill input interface configured to receive an input from a player;

displaying a plurality of spaces, by a digital board, each of the plurality of spaces depicting a win indicia or a lose indicia thereon, wherein the win indicia or the lose indicia on each of the plurality of spaces intermittingly and graphically switch between one another, and wherein the win indicia relates to a winning game outcome and the lose indicia relates to a losing game outcome; and wherein said processor further performs, by executing the computer-readable instructions, steps comprising:
(i) receiving the input via said skill input interface causing an outcome indicator to highlight at least one of said plurality of spaces to identify a player-selection of either a win indicia or a lose indicia on the at least one of said plurality of spaces at a time of said input via said skill input interface; and
(ii) displaying a game play of a second casino game having an outcome commensurate with said player-selection, wherein the outcome of the second casino game in response to said player-selection of the win indicia results in an award amount added to the credit balance.

8. The method of claim 7 further comprising utilizing the skill input interface in the form of a button or touch screen.

9. The method of claim 7 further comprising moving said outcome indicator in a pre-established pattern.

10. The method of claim 7 further comprising utilizing the processor to map prizes onto said plurality of spaces.

11. The method of claim 7 further comprising moving said outcome indicator from space to space of said plurality of spaces.

12. The method of claim 7 wherein the second casino game is a slot style game.

13. A computer-implemented gaming device comprising:
a monetary input device configured to receive a physical item associated with a monetary value;
a user interface configured to:
enable a player to select a wager for a first casino game and enable the player to initiate a cash out operation;
at least one processor executing computer-readable instructions related to the first casino game, said at least one processor being programmed by the computer-readable instructions to:
add said monetary value to a credit balance for said player;
deduct said selected wager from said credit balance; and
decrease said credit balance in response to said cash out operation;
a display device configured to depict said first casino game in video format;
a memory device in communication with said at least one processor, said memory device storing said computer-readable instructions;
a skill input interface configured to receive an input from a player;
a digital board comprising a plurality of spaces, each of the plurality of spaces depicting a win indicia or a lose indicia thereon, wherein the win indicia or the lose indicia on each of the plurality of spaces intermittingly and graphically switch between one another, and wherein the win indicia relates to a winning game outcome and the lose indicia relates to a losing game outcome; and
wherein said processor is further programmed by the computer-readable instructions to:
(i) intermittingly map prizes to said plurality of spaces;
(ii) receive the input via said skill input interface causing an outcome indicator to highlight at least one of said plurality of spaces to identify a player-selection of either a win indicia or a lose indicia on the at least one of said plurality of spaces at a time of said input via said skill input interface; and
(iii) display a game play of a second casino game having an outcome commensurate with said player-selection, wherein the outcome of the second casino game in response to said player-selection of the win indicia results in an award amount added to the credit balance equivalent to the mapped prize associated with the at least one space highlighted in step (ii).

14. The computer-implemented gaming device of claim 13 wherein the skill input interface is a button or touch screen.

15. The computer-implemented gaming device of claim 13 wherein said plurality of spaces comprises sixteen spaces depicting the win indicia or the lose indicia thereon.

16. The computer-implemented gaming device of claim 13 wherein said outcome indicator moves from space to space of said plurality of spaces in a pre-established pattern.

17. The computer-implemented gaming device of claim 13 wherein said second casino game is based on a slot style game.

18. The computer-implemented gaming device of claim 13 wherein said outcome indicator comprises illuminated frames about said plurality of spaces.

* * * * *